US011277500B2

(12) United States Patent
Grosjean et al.

(10) Patent No.: US 11,277,500 B2
(45) Date of Patent: Mar. 15, 2022

(54) INTEGRATION OF A STANDARD NETWORK PROTOCOL LAYER IN A WEB BROWSER BY COMPILATION TO WEBASSEMBLY AND USE OF A WEBSOCKET

(71) Applicant: WALLIX, Saint-Honoré (FR)

(72) Inventors: Christophe Grosjean, Paris (FR); Serge Adda, Antony (FR)

(73) Assignee: WALLIX, Saint-Honoré (FR)

( * ) Notice: Subject to any disclaimer, the term of this patent is extended or adjusted under 35 U.S.C. 154(b) by 78 days.

(21) Appl. No.: 16/464,627

(22) PCT Filed: Nov. 7, 2017

(86) PCT No.: PCT/FR2017/053037
§ 371 (c)(1),
(2) Date: May 28, 2019

(87) PCT Pub. No.: WO2018/096232
PCT Pub. Date: May 31, 2018

(65) Prior Publication Data
US 2021/0099553 A1    Apr. 1, 2021

(30) Foreign Application Priority Data

Nov. 28, 2016    (FR) ...................................... 1661563

(51) Int. Cl.
*H04L 29/06*    (2006.01)
*H04L 12/66*    (2006.01)
(Continued)

(52) U.S. Cl.
CPC ............ *H04L 69/162* (2013.01); *H04L 12/66* (2013.01); *H04L 67/08* (2013.01)

(58) Field of Classification Search
CPC ........ H04L 69/162; H04L 67/08; H04L 12/66
See application file for complete search history.

(56) References Cited

U.S. PATENT DOCUMENTS 7,584,294 B2 * 9/2009 Plamondon ......... H04L 12/4641
709/233
9,407,725 B2 * 8/2016 Fausak ................ H04L 67/2823
(Continued)

FOREIGN PATENT DOCUMENTS

CN    102833338 B    3/2016

OTHER PUBLICATIONS

International Written Opinion for International Application No. PCT/FR2017/053037 dated Jan. 12, 2018, 6 pages, (the translation in the "Incoming Written Opinion".
(Continued)

*Primary Examiner* — Patrice L Winder
(74) *Attorney, Agent, or Firm* — TraskBritt

(57) ABSTRACT

A standard network protocol layer is integrated in a Web browser by compilation to Webassembly and use of a Websocket. A method for connecting a local client device to a remote computing resource, by establishing a computing session in accordance with a standard protocol includes: executing on the client device a Web browsing application; opening a first tunnel (websocket) with a server GATEWAY, wherein the opening of the first tunnel between the client device and the GATEWAY commands the opening of a network connection with the remote resource. The Web application executed on the local client calculates data packets in accordance with a standard protocol (RDP or SSH for example) and commands the transmission of the data packets to the remote resource in the native format of the protocol, without transcoding or transformation other than the standard processing of websockets, by way of the server gateway (Proxy websocket) ensuring the transfer without modification of the packet received from the client device, to the remote server.

13 Claims, 1 Drawing Sheet

(51) Int. Cl.
    *H04L 29/08*     (2006.01)
    *H04L 69/16*     (2022.01)
    *H04L 67/08*     (2022.01)

(56) References Cited

U.S. PATENT DOCUMENTS

| | | | |
|---|---|---|---|
| 9,459,936 B2 * | 10/2016 | Fallows | H04L 67/08 |
| 9,462,089 B1 * | 10/2016 | Fallows | H04L 69/14 |
| 9,628,810 B1 * | 4/2017 | Bingol | H04N 19/93 |
| 10,015,228 B2 * | 7/2018 | Bingol | H04L 67/38 |
| 10,382,402 B2 * | 8/2019 | Klaghofer | H04L 65/608 |
| 10,382,521 B2 * | 8/2019 | Fausak | H04L 67/025 |
| 10,558,824 B1 * | 2/2020 | Remington | G06F 21/6281 |
| 2008/0313545 A1 | 12/2008 | Patel et al. | |
| 2014/0372508 A1 | 12/2014 | Fausak et al. | |
| 2017/0139693 A1 | 5/2017 | Li | |

OTHER PUBLICATIONS

International Search Report for International Application No. PCT/FR2017/053037 dated Jan. 12, 2018, 2 pages.

\* cited by examiner

INTEGRATION OF A STANDARD NETWORK PROTOCOL LAYER IN A WEB BROWSER BY COMPILATION TO WEBASSEMBLY AND USE OF A WEBSOCKET

CROSS-REFERENCE TO RELATED APPLICATIONS

This application is a national phase entry under 35 U.S.C. § 371 of International Patent Application PCT/FR2017/053037, filed Nov. 7, 2017, designating the United States and published as International Patent Publication WO 2018/096232 A1 on May 31, 2018, which claims the benefit under Article 8 of the Patent Cooperation Treaty to French Patent Application Serial No. 1661563, filed Nov. 28, 2016.

TECHNICAL FIELD

The present disclosure relates to the field of computer network infrastructures and more precisely access to remote services via a web browser installed on a client computer.

BACKGROUND

Solutions using an intermediate transcoding server, for example, the web server or a specific server are known from the state of the art.

U.S. Patent Application Serial No. 20080313545 describes a known example of systems and methods ("tools") that enable a user to access and interact with a remote desktop or application, without the need to install a plug-in or software in addition to a web browser. In some embodiments, the tools include double buffering graphics that display the remote desktop or application, and caching images that are repeated. These tools may also include identifying the portion of the desktop or application that has changed, and then transmitting the changed portion.

U.S. Patent Application Serial No. 20140372508 A1 describes a native client tunnel service for client-server communication.

In particular embodiments, an HTML-compatible client device loads an HTML script. The client device executes the HTML script with a Native Client specification. The client device receives user information specifying a connection. The client device creates a port forward or a tunnel device, and connects to a target host through the port forward or the tunnel device.

Chinese Patent Application Serial No. CN10283333338, which describes a method comprising the following steps, is also known from the state of the art:
- a remote desktop server sends a packet of remote desktop protocol data to a Web server;
- the web server acknowledges the HTTP/HTTPS protocol data packet;
- a client-side protocol conversion unit converts the HTTP/HTTPS protocol data packet into a remote desktop protocol data packet.

A remote desktop protocol analysis module restores the remote desktop protocol data packet in a specific display command, and the display command is processed through a remote desktop display protocol module. The result is sent to the interactive page on the client side and displays images from a remote desktop to a user.

The solutions of the prior art are not totally satisfactory, as performance is limited by the computing, load-holding and memory capacities of the transcoding gateway servers.

The gateway servers of the prior art must maintain a memory state corresponding to each open connection, due to the connected protocols used.

When the number of client devices is large, the capacity of the transcoding gateway servers reaches saturation and limits the number of connections, unless hardware is increased.

In addition, when the protocol changes, it is necessary to rewrite the code in the browser language and to update the browsers on the client workstations from the web server.

On the other hand, in the solutions of the prior art, two protocols are implemented:
- a first initial protocol between the terminal server and the intermediate server (gateway), which is a complete protocol; and
- a second protocol between the client workstation and the intermediate server (gateway), which is a subset or a simplified equivalent of the initial protocol.

In simplifications, the negotiation functions of the protocol are generally removed. As a result, this protocol is less flexible and implies that all clients operate in the same way, without enabling clients of different generations to coexist on the same infrastructure.

The Chinese Patent Application Serial No. CN10283333338 does not disclose the characteristics of the invention and, in particular, the fact that the computer code of the standard protocol consists of a JavaScript component with three layers:
- a layer for interfacing with the input-output devices;
- a network interface layer ensuring the control of the websocket; and
- a protocol layer consisting of a standard code compiled in ASM.js or Webassembly from a source code in a high-level language.

BRIEF SUMMARY

In order to remedy this drawback, the present disclosure, in its broadest sense, relates to a method for connecting a local client device to a remote computing resource, by establishing a computing session in accordance with a standard protocol consisting of:
- executing, on the client device, a web browsing application;
- opening a first tunnel [websocket] with a server GATEWAY; and
- the opening of the first tunnel between the client device and the GATEWAY commanding the opening of a network connection with the remote resource.

This solution solves the bottleneck problem on the transcoding gateway server resulting from the shared use of the code, as the processing performed is minimal. Network latency depends on the characteristics of the client workstation, and the additional latency introduced by the GATEWAY is minimal.

The server load required for transcoding is transferred to the client, which means that the server can support more simultaneous sessions for lower power consumption.

Finally, the protocol flow uses only standard network infrastructures and is secured via the HTTPS security layer of the web browser.

The natural solutions for the skilled person would consist in:
- either dividing the RDP client into two components: a restricted component embedded in the browser and a standalone server component running on a proxy server. The two components communicate with each other via a simplified protocol through a fast network link. This architecture is very common. It can be found not only for some RDP or SSH clients embedded in a web browser, but also for all webmail clients.

This is the solution adopted by the Chinese Patent Application Serial No. CN10283333338. Unlike this solution, the present disclosure provides to have the native RDP packets pass through a Websocket tunnel to the browser.

or to rely on a browser-specific extension layer (plugin) (Microsoft ActiveX, Google Native Client NaCL) that allows access to privileged system resources and communicating with a Web application.

It is known that the technique of compiling the C/C++ code to WebAssembly from an existing application does not work when the source code includes blocking operations (see U.S. Patent Application Serial No. 20170139693 "Code execution method and device)."

The architecture which is the object of the present disclosure makes it possible, in particular, to remove this constraint within the framework of protocol network layers.

According to the present disclosure, the Web application is executed on the local client and calculates data packets according to a standard protocol (e.g. RDP or SSH) and commands the transmission of the data packets to the remote resource in the native format of the protocol, without transcoding or transformation other than standard web socket processing, through the gateway server (Proxy websocket) ensuring the transfer without modification of the packet received from the client device to the remote server and in that:

the computer code of the standard protocol consists of a JavaScript component with three layers:
a layer for interfacing with the input-output devices;
a network interface layer ensuring the control of the websocket; and
a standard protocol code compiled in ASM.js or Webassembly from a source code in a high level language.

The method according to the present disclosure may have the following advantages:
the update of the browser code according to the evolutions of the protocol is carried out by a common strain and an update of the client code only. This avoids updating both the code executed by the transcoding gateway servers and the applications embedded by the browsers on the client workstations. Unlike the prior art, in the method of the present disclosure, it is not necessary to update the transcoding server.
the solution according to the present disclosure also enables a better use of the bandwidth, as the additional transcoding steps and the use of a second specific protocol for transferring to the Web client are avoided.

An important technical effect is that the bottleneck problem on the transcoding gateway server resulting from the shared use of the code is reduced, as the processing performed is minimal. Network latency depends on the characteristics of the client workstation, and the additional latency introduced by the GATEWAY is minimal.

The server load required for transcoding is transferred to the client, which means that the server can support more simultaneous sessions for lower power consumption.

Finally, the protocol flow uses only standard network infrastructures and is secured via the HTTPS security layer of the web browser.

BRIEF DESCRIPTION OF THE DRAWINGS

The present disclosure will be best understood upon reading the following detailed description of a non-restrictive exemplary embodiment, while referring to the appended drawings, wherein.

DETAILED DESCRIPTION

Disclosed is a terminal application server (1) that comprises one or more websocket/TCP socket gateway computer server(s) (2), and a plurality of client workstations executing, in particular, a web browser application (4).

The terminal application server (1) communicates with the external environment using a standard protocol, for example, RDP or SSH. The solution according to the disclosure does not involve any intervention or modification of the terminal application server (1) or its communication interfaces.

Figure 1:
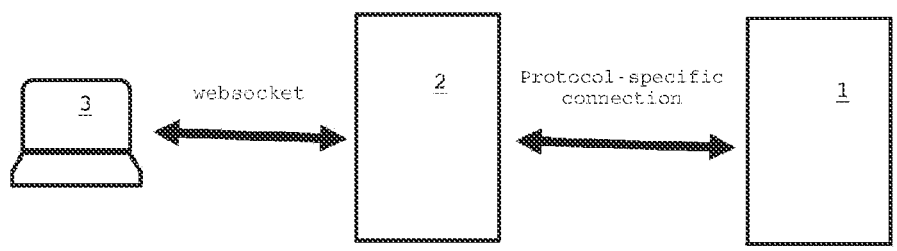
FIG. 1 is a schematic view of the functional architecture of one infrastructure according to the disclosure.
Figure 2:
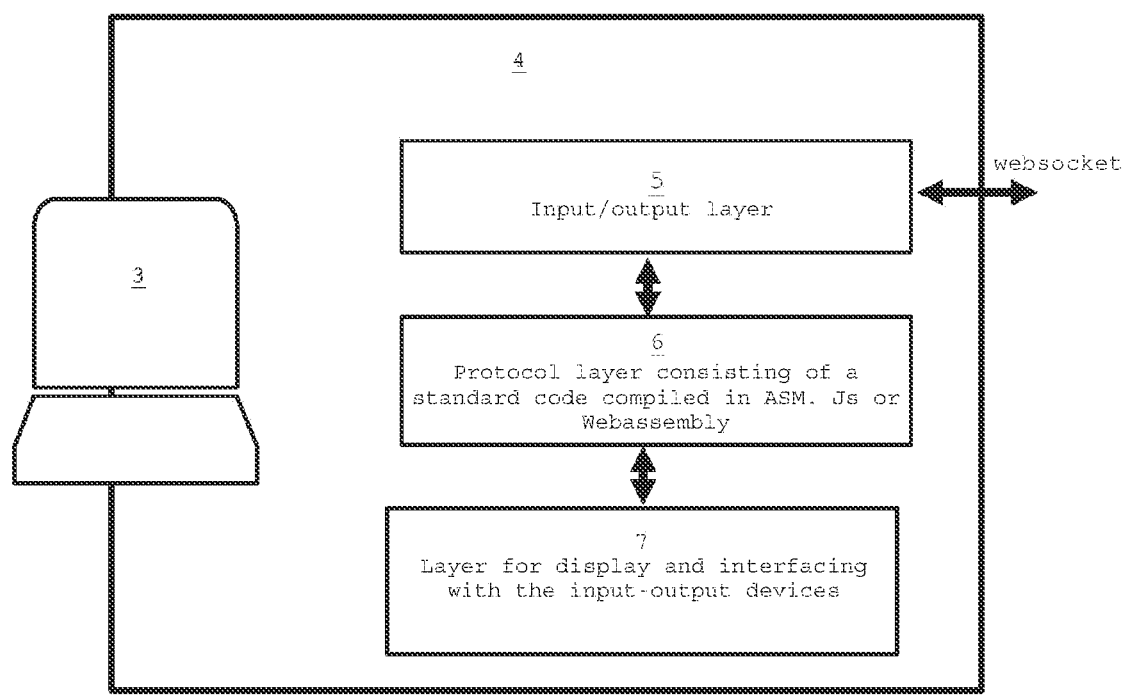
FIG. 2 shows a schematic view of the architecture of the client workstation.

The main part of the disclosure is reflected in the modifications made to the application embedded in the browser (4), as detailed in FIG. 2 and executed by the client workstation (3).

This embedded application consists of several layers:
a display layer (7) executing display commands from the protocol, e.g. bitmap, character, text, image plot, etc., according to the RDP or SSH protocol. This layer also performs functions of interaction with the keyboard, the mouse and more generally the input devices. This layer consists of a JavaScript program written specifically for the protocol, for example, in an HTML5 language. This layer is available for a variety of devices, such as computers, cell phones, touch screen tablets, etc.
a protocol layer (6) compiled to asm.js or Webassembly, using, for example, the Emscripten compilation string, assembled from a code strain written in a high-level language, typically in C or C++. This layer implements the decoding and encoding of the network protocol, from known libraries available as a source code, for example, the ReDemPtion code (trade name of the WALLIX company, available under free license, which is a free implementation of the RDP protocol of the MICROSOFT company).

This protocol layer preferably controls the protocol data preloading functions of the input/output layer (5).

An input/output layer (5) based on the HTML5 Websocket protocol. This input/output layer (5) preloads the protocol packets into the RAM of the client workstation, so as to enable asynchronous operation, and to adapt the solution according to the present disclosure to an essentially synchronous protocol.

When initiating a connection, three solutions are provided:
the first solution provides that the gateway server (2) imposes the target (predefined terminal application server (1), and not modifiable by the client device (3)).
the second solution provides for a prior negotiation for the configuration of the terminal application server (1), by a mechanism linked to the gateway server (2).
the third solution provides for the installation of a specific protocol extension, commanding the opening of the session, prior to the start of the main protocol.

The gateway server (2) provides a simple relay function of the underlying protocol, between the WEBSOCKET transport layer 5 and the transport layer between the gateway server (2) and the terminal application server (1). Unlike the solution of the prior art, the gateway server 2 does not provide any intelligent functions such as protocol decoding, bitmap caching, etc., functions that, according to the disclosure, are performed by the application embedded in the browser of the client workstation.

The gateway server (2) can execute a standard code of the APACHE module type ensuring the WEB SOCKET relay to the terminal application server 1.

The invention claimed is:

1. A method for connecting a local client device to a remote computing resource, by establishing a computing session in accordance with a standard protocol comprising:
executing, on the local client device, a web browsing application; and
opening a first tunnel websocket with a server gateway, the opening of the first tunnel websocket between the local client device and the server gateway commanding opening of a network connection with the remote computing resource;
wherein the web browsing application executed on the local client device calculates data packets in accordance with the standard protocol and commands a transmission of the data packets to the remote computing resource in a native format of the standard protocol, without transcoding or transformation other than standard processing of websockets, by way of the server gateway ensuring a transfer without modification of the data packets received from the local client device to the remote computing resource;
wherein the server gateway transfers the data packets to the remote computing resource without providing protocol decoding or bitmap caching; and
wherein a computer code of the standard protocol comprises a JavaScript component including:
a layer for interfacing with input-output devices;
a network interface layer ensuring control of the first tunnel websocket; and
a protocol layer comprising a standard code compiled in ASM.js or Webassembly from a source code in a high-level language.

2. The method of claim 1, wherein the standard protocol comprises a remote desktop protocol (RDP) or a secure shell (SSH) protocol.

3. The method of claim 1, wherein the layer for interfacing with the input-output devices comprises a display layer executing display commands from the standard protocol.

4. The method of claim 1, wherein the layer for interfacing with the input-output devices performs a function of interaction with input devices.

5. The method of claim 4, wherein the input devices comprise a keyboard and/or a mouse.

6. The method of claim 1, wherein an input/output protocol code preloads a protocol packet into memory of the local client device to allow asynchronous operation.

7. The method of claim 1, further comprising securing, with a security layer of the web browsing application, a protocol flow of the standard protocol.

8. The method of claim 7, wherein the security layer comprises a hypertext transfer protocol secure (HTTPS) security layer.

9. The method of claim 1, wherein the high-level language includes one or more of C or C++.

10. A method for connecting a local client device to a remote computing resource, by establishing a computing session in accordance with a standard protocol comprising:
executing, on the local client device, a web browsing application;
opening a first tunnel websocket with a server gateway, the opening of the first tunnel websocket between the local client device and the server gateway commanding opening of a network connection with the remote computing resource; and
carrying out an update of browser code of the web browsing application of only a client code responsive to evolutions of the standard protocol without updating code executed by the server gateway and without updating code executed by applications embedded by the web browsing application on the local client device;
wherein the web browsing application executed on the local client device calculates data packets in accordance with the standard protocol and commands a transmission of the data packets to the remote computing resource in a native format of the standard protocol, without transcoding or transformation other than standard processing of websockets, by way of the server gateway ensuring a transfer without modification of the data packets received from the local client device to the remote computing resource; and
wherein a computer code of the standard protocol comprises a JavaScript component including:
a layer for interfacing with input-output devices,
a network interface layer ensuring control of the first tunnel websocket; and
a protocol layer comprising a standard code compiled in ASM.js or Webassembly from a source code in a high-level language.

11. A communication system, comprising:
a local client device configured to execute a web browsing application, the web browsing application configured to calculate data packets in accordance with a standard protocol and command a transmission of the data packets to a remote computing resource in a native format of the standard protocol, a computer code of the standard protocol comprising a JavaScript component including three layers, the three layers including:
a layer for interfacing with input-output devices;
a network interface layer ensuring control of a tunnel websocket between the local client device and the remote computing resource; and
a protocol layer comprising a standard code compiled in ASM.js or Webassembly from a source code in a high-level language; and
a server gateway device configured to: open the tunnel websocket, the opening of the tunnel websocket commanding an opening of a network connection with the remote computing resource; ensure transfer of the data packets to the remote computing resource without modification of the data packets; and transfer the data packets to the remote computing resource without providing protocol decoding or bitmap caching.

12. The communication system of claim 11, wherein the local client device is configured to provide one or more of the protocol decoding or the bitmap caching.

13. The communication system of claim 11, wherein the protocol layer is configured to implement decoding and encoding of the standard protocol from one or more libraries available as a source code.

* * * * *

UNITED STATES PATENT AND TRADEMARK OFFICE
CERTIFICATE OF CORRECTION

PATENT NO. : 11,277,500 B2
APPLICATION NO. : 16/464627
DATED : March 15, 2022
INVENTOR(S) : Christophe Grosjean and Serge Adda It is certified that error appears in the above-identified patent and that said Letters Patent is hereby corrected as shown below:

In the Specification
Column 5, Line 5, change "WEB SOCKET" to --WEBSOCKET--

Signed and Sealed this
Tenth Day of May, 2022

Katherine Kelly Vidal
*Director of the United States Patent and Trademark Office*